(12) United States Patent
Stolz et al.

(10) Patent No.: US 12,469,613 B2
(45) Date of Patent: Nov. 11, 2025

(54) RADIOPROTECTIVE CONTAINER FOR RADIOMETRIC MEASURING DEVICES

(71) Applicant: Endress+Hauser SE+Co. KG, Maulburg (DE)

(72) Inventors: Lars Stolz, Eimeldingen (DE); Romy Gabel, Eppingen-Mühlbac (DE); Simon Weidenbruch, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 364 days.

(21) Appl. No.: 18/253,710

(22) PCT Filed: Oct. 28, 2021

(86) PCT No.: PCT/EP2021/080020
§ 371 (c)(1),
(2) Date: May 19, 2023

(87) PCT Pub. No.: WO2022/106175
PCT Pub. Date: May 27, 2022

(65) Prior Publication Data
US 2024/0006090 A1    Jan. 4, 2024

(30) Foreign Application Priority Data

Nov. 19, 2020    (DE) .................... 10 2020 130 624.5

(51) Int. Cl.
*G21F 5/04*    (2006.01)
*G21F 5/015*   (2006.01)

(52) U.S. Cl.
CPC ............... *G21F 5/04* (2013.01); *G21F 5/015* (2013.01)

(58) Field of Classification Search
CPC .......... G21F 5/04; G21F 5/015; G01F 23/288; G01F 15/14
See application file for complete search history.

(56) References Cited

U.S. PATENT DOCUMENTS 6,190,303 B1    2/2001  Glenn et al.
2017/0294244 A1  10/2017  Benson et al.

FOREIGN PATENT DOCUMENTS

| CN | 104412077 A | 3/2015 |
| CN | 210271811 U | 4/2020 |
| DE | 1267882 A | 10/1962 |

(Continued)

*Primary Examiner* — Robert H Kim
(74) *Attorney, Agent, or Firm* — Kelly J. Smith; Endress+Hauser (USA) Holding, Inc.

(57) ABSTRACT

A radiation protection container of a measuring system serves for radiometric density or fill level measurement. The radiation protection container is based on two base bodies connected to one another via a planar surface. The radiation waveguide extends for focused emission in a plane defined by the planar surface, wherein the radiation waveguide is formed by depressions in the base body surfaces. The radiation protection container comprises radiation absorption structures formed by depressions and complementary elevations in the base body surfaces lying on top of each other. An advantage is that refractory base bodies based on steel can be used and it is possible for the depressions and/or elevations to be realized using surface machining. The radiation absorption structures ensure that no radiation exits the radiation protection container laterally.

11 Claims, 3 Drawing Sheets

(56) References Cited

FOREIGN PATENT DOCUMENTS

| | | | |
|---|---|---|---|
| DE | 102011077304 A1 | 12/2012 | |
| DE | 102014101373 A1 | 8/2015 | |
| DE | 102016122048 A1 | 5/2018 | |
| DE | 102017115788 A1 | 1/2019 | |
| EP | 2208031 B1 | 4/2015 | |
| FR | 2776118 A1 * | 9/1999 | ............. G21F 5/008 |
| WO | 2012168054 A2 | 12/2012 | |

\* cited by examiner

RADIOPROTECTIVE CONTAINER FOR RADIOMETRIC MEASURING DEVICES

CROSS-REFERENCE TO RELATED APPLICATIONS

The present application is related to and claims the priority benefit of DPMA Patent Application No. 10 2020 130 624.5, filed on Nov. 19, 2020, and International Patent Application No. PCT/EP2021/080020, filed Oct. 28, 2021, the entire contents of which are incorporated herein by reference.

TECHNICAL FIELD

The invention relates to a radiation protection container for radiometric density or fill level measurement.

BACKGROUND

In automation technology—especially in process automation technology—field devices serving to detect and/or modify process variables are frequently used. In order to detect process variables, sensors are used, which are, for example, used in fill level measuring instruments, flow rate measuring instruments, pressure and temperature measuring instruments, pH redox potential measuring instruments, conductivity measuring instruments, etc. They detect the corresponding process variables, such as the fill level, flow rate, pressure, temperature, pH value, redox potential, or conductivity. Actuators, such as valves or pumps among other things, by means of which the flow rate of a liquid in a pipeline portion or the fill level in a container can be altered, are used to influence process variables. Within the scope of the invention, the term "container" also refers to containers that are not closed, such as pools, lakes or flowing bodies of water. All instruments that are used near the process and provide or handle process-relevant information are generally called field devices. A variety of such field devices is manufactured and marketed by the Endress+Hauser company.

In the case of density or fill level measurements, field devices are often used, the measurement method of which is based on radiometry. In this measurement method, radioactive radiation (for example gamma radiation of a cesium or cobalt source) is used, which is emitted by a radioactive radiation source of the measuring instrument and is guided through the container with the filling material to be measured. After passing through the container, the transmitted radiation intensity is detected by a detector unit of the measuring instrument. By evaluation of the detector signal, the transmitted portion of the emitted radiation intensity is determined. On the basis thereof, the density or the fill level of the filling material is concluded. In this case, the transmitted portion of the radioactive radiation power cannot be directly detected after passing through the container, but rather the radioactive radiation must first be converted, by a material suitable for this purpose, into electromagnetic radiation in the optical spectral range, before the radiation power can be detected by a photomultiplier (or alternatively one or more avalanche photodiodes) within the detector unit. Materials that have this property are referred to as scintillating materials. Inter alia, polystyrene has this scintillating property. Only the radiation located in the optical spectral range can be detected by the photomultiplier. Radiometric fill level or density measuring instruments are already known from the prior art. The basic operating principle is described in the patent specification EP 2 208 031 B1, for example.

A shielding radiation protection container is used for safe transport of the radiation source and for its safe measurement operation. On the one hand, this must be designed such that the radiation source is protected from damage and from removal by unauthorized persons. On the other hand, the radiation protection container must provide shielding of the radiation towards the surroundings. For this purpose, the radiation protection container according to the prior art is constructed from lead or another material that provides sealing against radioactivity.

For the measurement operation, the radiation protection container has an open end region, such that a focused useful beam can exit from the radiation protection container in the direction of the detector unit. The end region located at the end of a radiation waveguide can be closed in the radiation protection container for safe storage and transport of the source. In this case, the closure can take place via movable, shielding shutters or rotatable/displaceable radiation sources. During the production of the shielding radiation protection container, the radiation waveguide is produced by recesses during casting of the lead-based or cast-steel base body, or subsequently by milling or drilling of the cast base body.

Radiation protection containers produced from lead have significant disadvantages, in particular when used in higher ambient temperatures and/or with respect to the fire resistance. It is therefore obvious to replace the lead-based base body of the radiation protection container with a refractory/high-temperature-resistant base body made of steel or tungsten. If the radiation protection container is produced analogously to lead from cast steel (which is not possible in the case of tungsten per se), the production of the radiation protection container is significantly less economical compared to a comparably advantageous and also easy to cast lead.

In the event that solid raw material, for example in the form of extruded profiles or round stock, is used for the production of the radiation protection container, the necessary radiation waveguide in the interior of the radiation protection container, for directional emission of the radiation along the beam axis, can be produced only by complex milling, drilling or electrical discharge machining. With regard to the required shielding thickness, the radiation waveguide must, in these cases, be incorporated several centimeters deep, which is in turn technically very complex and expensive. Additive methods for producing the shielding, i.e. for example 3D printing methods, are likewise not practicable from an economic point of view.

SUMMARY

The invention is therefore based on the task of providing a safe and temperature-resistant radiation protection container which can be produced economically.

The invention achieves this task by a radiation protection container for a radiation source of a measuring system, which is used for radiometric density or fill level measurement. For this purpose, the radiation protection container comprises:

a first base body having a first planar surface,
a second base body having a second planar surface, a first connecting means which connects the first base body and the second base body at the surfaces in a form-fitting manner, in such a way that the surfaces define a planar plane, a straight-axis radiation waveguide extending in the plane, which is formed by a corresponding depression in at least one of the surfaces of the two base bodies, having a first open end region on which the radiation source can be fixed, and a second open end region, at least one first radiation absorption structure, which is formed by depressions and complementary elevations in the first surface and in the second surface, respectively, such that the first radiation absorption structure extends in the plane, proceeding from the radiation waveguide.

The two-part design of the radiation protection container, according to the invention, makes it possible to use temperature-resistant steel as the manufacturing material of the base body, wherein it is possible for the radiation waveguide to be produced with little effort before the connection of the base bodies, for example by means of surface machining. In the connected state of the base body or during the measuring operation of the measuring system, the shielding against lateral escape of the radiation along the plane is ensured, according to the invention, by the radiation absorption structure.

In order for the radiation protection container to shield against radiation exit on both sides, in relation to the radiation waveguide, it is advantageous for the radiation absorption structure to in each case have on both sides, in particular symmetrically, in the plane in relation to the beam axis, a profile proceeding from the radiation waveguide. In this case, the radiation absorption structure can be designed, with respect to the beam axis, having a profile which is curved in the plane towards the first end region in a circular segment shape by up to 90°, in order to achieve a complete shielding by +/−90° on both sides of the radiation waveguide, proceeding from the radiation source. The shielding can be improved even further if the radiation protection container comprises not only one, but rather a plurality of, radiation absorption structures arranged in the plane, which are each arranged at an increasing distance from the first end region in relation to the beam axis. The cross section of the radiation absorption structure is determined by the production method thereof. In terms of shielding technology, it is most effective for the radiation absorption structure to have a rectangular cross section.

Within the framework of the invention, the way in which the two base bodies are connected is not firmly specified. In the case of steel-based base bodies, the first connecting means can be designed, for example, as a welded connection. In the simplest case, however, the first connecting means can also be designed as a screw connection, for example.

On the basis of the radiation protection container according to the invention, a measuring system for the radiometric determination of the density and/or fill level of a filling material located in a container can be realized by means of the following additional components, wherein the radiation protection container is to be attached, for this purpose, to the container in such a way that the second end region of the radiation waveguide, and thus the beam axis, is oriented in the direction of the container:

a radioactive radiation source which can be fastened to the first end region of the radiation waveguide by means of a corresponding insert for example, a detector unit which can be attached to the container, in the beam axis, so as to be opposite the radiation source, in order to detect a radiation intensity of the radiation source after radiation through the filling material, and an evaluation unit, which is designed to determine the density and/or fill level of the filling material in the container on the basis of the received radiation intensity.

The radiation source or a corresponding insert for the radiation source can be designed in a manner corresponding to a thread on the base bodies, having a corresponding internal or external thread, such that the radiation source can be fastened to the radiation protection container by means of the resulting screw connection. The screw connection can be implemented in such a way that the thread axis of the screw connection extends in parallel with the beam axis of the radiation waveguide. Such fastening of the radiation source to the radiation protection container by means of a screw connection offers the advantage that the radiation protection container can be provided with a shutter function for securely transporting the radiation source. For this purpose, the radiation source is to be arranged having a defined radial offset with respect to the thread axis of the screw connection, and the radiation waveguide is to be arranged within the plane in such a way that its beam axis has the same defined radial offset with respect to the thread axis of the screw connection as the radial offset of the radiation source with respect to the thread axis. Thus, depending on how far the insert or the radiation source is screwed in, the radiation source is congruent with the beam axis of the radiation waveguide. This corresponds to an open state of the shutter. If the screw connection is not screwed in this position, such that the radiation source is not congruent with the beam axis of the radiation waveguide, this corresponds to a closed state of the shutter. In this regard, it is optimal to design the screw connection in such a way that the radiation source lies in the beam axis of the radiation waveguide when the screw connection is in an end stop position, such that the resulting shutter is open when the screw connection is in an end stop position.

BRIEF DESCRIPTION OF THE DRAWINGS

The invention is explained in greater detail with reference to the following figures, in which.

DETAILED DESCRIPTION

Figure 1:
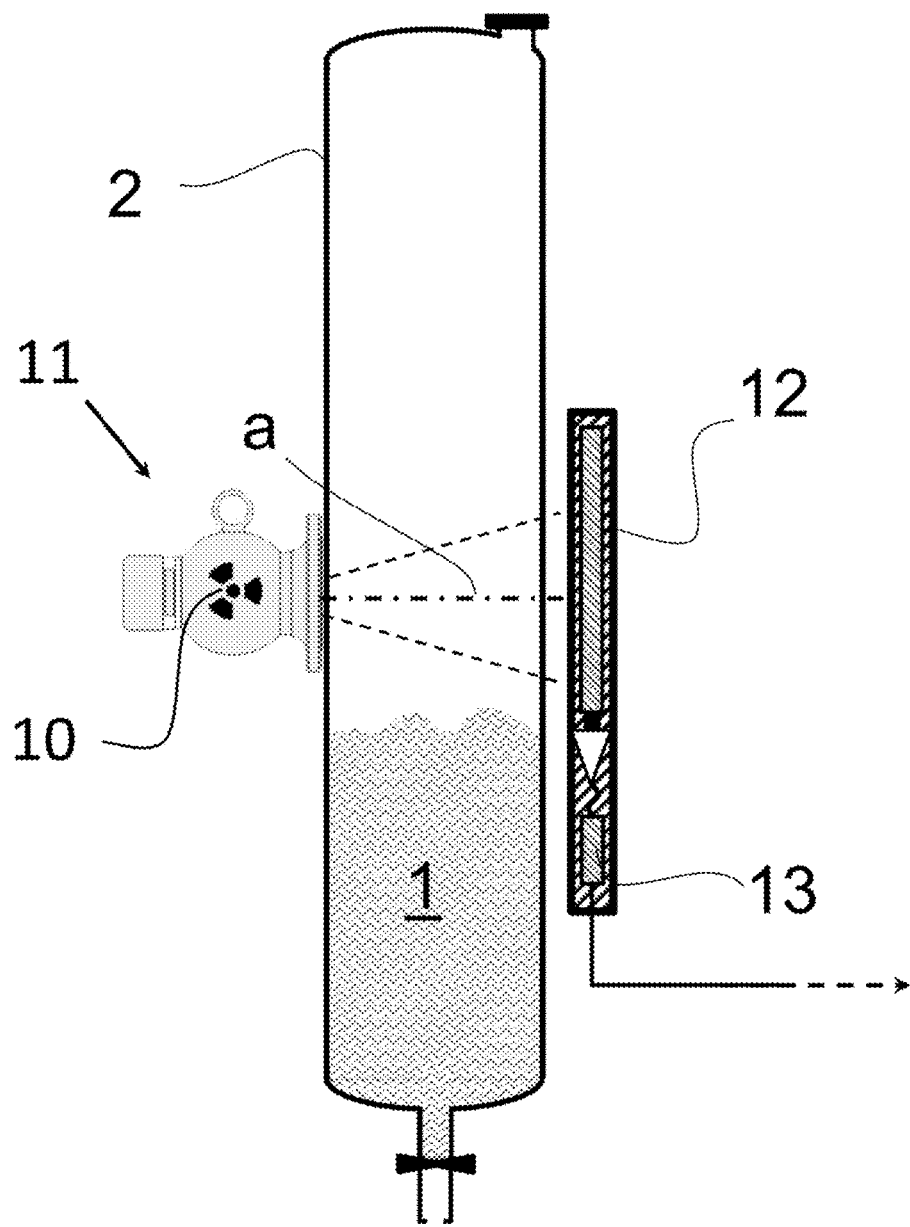
FIG. 1 shows a radiometric measuring instrument on a container.

For general understanding of radiometric density and fill level measurement, FIG. 1 shows a container 2 which is filled with a filling material 1. Depending on the field of application of the container 2 or the type of filling material 1, the density and/or the fill level of the filling material 1 in the container 2 must be determined. For this purpose, a measuring system based on radiometry is arranged on the container 2. In this case, the measuring system comprises a radiation source 10, a detector unit 12 and an evaluation unit 13 downstream of the detector unit 12. The radiation source 10 is located in a radiation protection container 11, which, in the open state, allows the radiation of the radiation source 10 to exit along a defined beam axis a.

In order to measure the density or fill level, the radiation protection container 11 and the detector unit 12 are arranged in such a way that the beam axis a of the radiation protection container 11 is directed towards the filling material 1. Furthermore, the detector unit 12 is arranged opposite the radiation protection container 11 in relation to the container 2, in such a way that the detector unit 12 is arranged as centrally as possible in the beam axis a of the radiation source 10, in order to detect the intensity of the radiation after passage through the filling material 1. For this purpose, the radiation protection container 11 and the detector unit 12 can either be mounted directly on the container 2, or indirectly on correspondingly free-standing stands. Based on this radiation intensity determined indirectly by scintillator, the evaluation unit 13 can determine the density or the fill level depending on the requirement, for example after corresponding calibration on the container 2.

Figure 2:
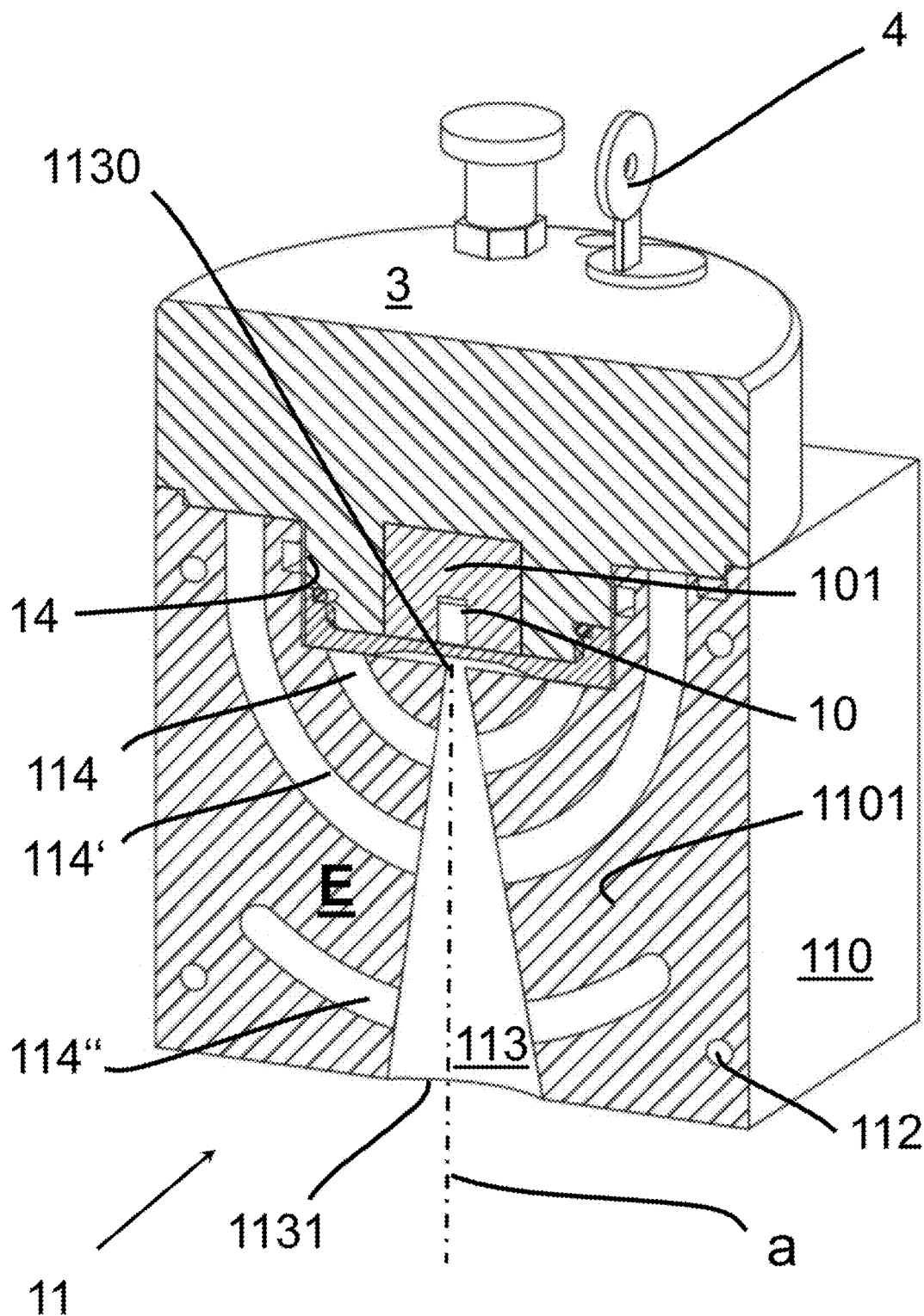
FIG. 2 shows a first cross-sectional view of the radiation protection container according to the present disclosure.

Depending on the application, the radiometric measuring system is to be designed to be fire-proof for measuring operation, as is specified for example in the IEC 62598:2011 standard series. A possibility according to the invention for producing the radiation protection container 11 with little effort, without having to resort to fire-resistant tungsten as the manufacturing material, is therefore explained in more detail with reference to FIG. 2 and FIG. 3:

The radiation protection container 11, shown there, for the radiation source 10 or for an insert 3 in which the radiation source 10 is embedded is based on two cuboidal base bodies 110, 111, of which only the first base body 110 is shown in FIG. 2 for the sake of clarity. Both main bodies 110, 111 each have a first surface 1101 or a second surface 1111, wherein the surfaces 1101, 1111, with the exception of a radiation waveguide 113 and with the exception of radiation absorption structures 114, 114', 114", are formed in a planar manner in each case. In this case, the planar surfaces 1101, 1111 in the embodiment shown are each formed from one of the side surfaces of the cuboid.

Figure 3:
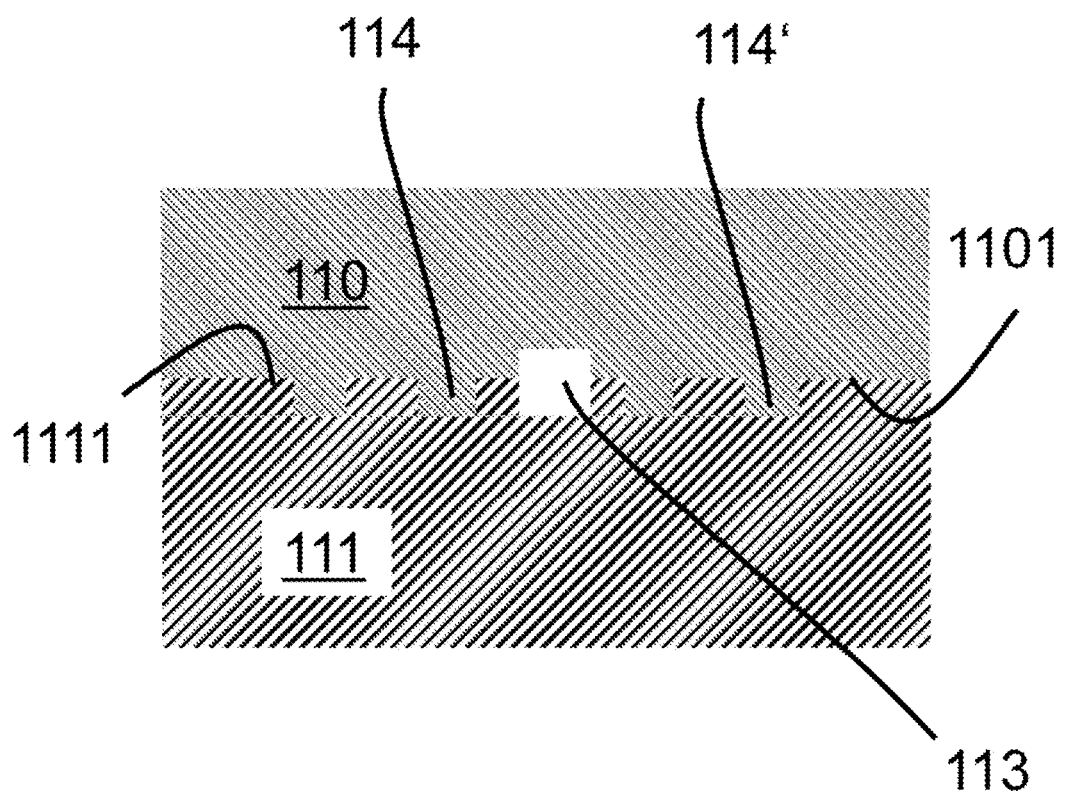
FIG. 3 shows a second cross-sectional view of the radiation protection container according to the present disclosure.

FIG. 3 is a cross-sectional view of the radiation protection container 11, which extends orthogonally to the axis a of the radiation waveguide 113 and at the level between the first absorption structure 114 and the first end region 1130: As is clear from this, the base bodies 110, 111 are fastened to one another, in the finished state of the radiation protection container 11, in such a way that the predominantly planar surfaces 1101, 1111, with the exception of the radiation waveguide 113, adjoin one another in a form-fitting manner, within the scope of the manufacturing tolerances, such that the planar regions span a correspondingly planar plane E. Since the base bodies 110, 111 can be manufactured from steel, they can be welded, for example along the edges of the surfaces 1101, 1111, in order to form the radiation protection container 11. However, it is also conceivable to connect the base bodies 110, 111 by means of a 14 screw connection. As is indicated in FIG. 2, the base bodies 110, 111 can be provided, for this purpose, with four screw passages or four internal threads in each case, extending orthogonally to the plane E, wherein the passages of one base body 110, 111 in this case are intended to be arranged congruently with respect to the passages or internal threads of the other base body 110, 111.

Within the assembled radiation protection container 11, the radiation waveguide 113 is formed of opposite, mirror-symmetrically formed depressions in the surfaces 1101, 1111 of the base bodies 110, 111, in such a way that the radiation waveguide 113 extends within the plane E, from a first open end region 1130 on the cuboid to an opposite end region 1131 of the cuboid.

In the embodiment shown in FIG. 2 or FIG. 3, the depressions of the radiation waveguide 113 have a rectangular cross section, such that the resulting radiation waveguide 113 likewise has a rectangular cross section. In contrast to this illustration shown, it is alternatively also conceivable for the radiation waveguide 113 to have a round cross section, for which purpose the corresponding depressions have a semicircular cross section in each case. As an alternative to the variant shown, it is also conceivable for the radiation waveguide 113 to be formed only by a depression in one of the two surfaces 1101, 1111. Regardless of the cross-sectional shape of the radiation waveguide 113, the radiation waveguide 113 can be designed for improved beam focusing, such that the radiation waveguide 113 widens towards the second end region 1131, as is shown in FIG. 2. The depression(s) for the radiation waveguide 113 can be formed, for example, by subsequent machining of the surfaces 1101, 1111 by means of corresponding machining methods.

Moreover, in the region of the radiation absorption structures 114, 114', 114", the surfaces 1101, 1111 adjoin one another in a form-fitting manner after connection of the two base bodies 110, 111 in the tolerance range of the corresponding manufacturing method, since the radiation absorption structures 114, 114', 114" are formed of corresponding elevations in one of the two surfaces 1101 and corresponding depressions in the other surface 1101 in each case. As can be seen in FIG. 3, the elevations of the radiation absorption structures 114, 114', 114" in the embodiment shown are located in the first surface 1101 or in the first base body 110, wherein the second base body 111 has the depressions corresponding thereto in the second surface 1111, as can be seen from FIG. 3.

The variant of the radiation protection container 11 shown in FIG. 2 and FIG. 3 comprises three radiation absorption structures 114, 114', 114", which are arranged along the beam axis a at increasing distance from the first end region 1130 in each case. In this case, the shape which the radiation absorption structures 114, 114', 114" form in the plane E is shown in FIG. 2: Accordingly, the radiation absorption structures 114, 114', 114" proceed orthogonally from the beam axis a on both sides in the plane E, wherein the radiation absorption structures 114, 114', 114" curve in the shape of a circular segment towards the first end region 1130 with increasing distance from the beam axis a. In this case, the radiation absorption structure 114 which is arranged closest to the first end region 1130, and the middle radiation absorption structure 114', are each curved by 90°. The radiation absorption structure 114" which is arranged closest to the second end region 1131 has a curvature of approximately 30° towards the first end region 1130.

As a result of this design, as soon as the radiation source 10 is attached to the first end region 1130, the radiation absorption structures 114, 114', 114" prevent a lateral radiation exit from the radiation protection container 11 along the plane E, even if possible tolerances in the manufacture or during connection of the base bodies 110, 111 lead to a lack of form-fitting engagement between the surfaces 1101, 1111. The depressions and elevations for the radiation absorption structures 114, 114', 114" can again be formed, for example, by machining the surfaces 1101, 1111 by means of corresponding machining methods, before the base bodies 110, 111 are connected.

As shown in FIG. 2, in the variant there the radiation source 10 is enclosed in a rotary insert 3 for fastening to the first end region 1130. In this case, the insert 3 is designed in such a way that the radiation source 10 within the insert 3 is shielded on all sides by a tungsten-based sheathing 101, except for an opening towards the first end region 1130 of the radiation waveguide 113. In this case, the term "opening" is also understood, in this connection, to mean a region lined with a corresponding material, which can be penetrated by the radiation of the radiation source 10 with low loss, for example 1.5 mm thick steel.

The rotary insert 3 and the base bodies 110, 111 are designed having a corresponding screw connection 14, in order to be able to screw the rotary insert 3 onto the radiation protection container 11 in such a way that the opening of the radiation source 10 within the rotary insert 3 adjoins the first end region 1130 of the radiation waveguide 113. For this purpose, the radiation source 10 is arranged within the rotary insert 3 on the thread axis of the screw connection 14. In addition, the screw connection 14 is designed such that its thread axis extends congruently to the beam axis a of the radiation waveguide 113. As a result, the radiation source 10 is automatically also located in the beam axis a of the radiation waveguide 113, in the mounted state, such that the radiation source 10 radiates—exclusively—via the second end region 1131 of the radiation waveguide, along its beam axis a.

In order to realize the screw connection 14, in the variant shown the rotary insert 3 comprises a corresponding external thread, wherein the base bodies 110, 111 form a corresponding internal thread. It is self-evident within the scope of the invention that the rotary insert 3, alternatively to the illustration shown, can also comprise the internal thread, and the radiation protection container 11 can comprise the external thread of the screw connection 14.

Since the thread axis of the screw thread 14, in the variant shown in FIG. 2, extends congruently with the beam axis a of the radiation waveguide 113, and the radiation source 10 is located within the rotary insert 3 on the thread axis of the screw thread 14, the radiation source 10 radiates automatically as soon as it is screwed on even incompletely. In contrast to this embodiment, a shutter function can be realized for transporting the radiation protection container 11, provided that the beam axis a of the radiation waveguide 113 extends in parallel with the thread axis of the screw thread 14, but with a defined radial offset. In order to realize the shutter function, in this case the radiation source 10 is also to be arranged within the rotary insert 3 having the same radial offset to the thread axis of the screw of the screw connection 14. As a result, the resulting shutter is only opened when the rotary insert 3 is screwed into the radiation protection container 11 exactly so far that the radiation source 10 is located in the beam axis a of the radiation waveguide 113. Optimally, the shutter function is implemented such that the shutter is open when the rotary insert 3 is screwed into the radiation protection container 11 up to a defined end stop. In order to prevent misuse or accidents in connection with the radiation source 10, the rotary insert 3 and the radiation protection container 11 can also be provided with a closing mechanism 4, by means of which the rotary insert 3 can be fixed in a position, on the radiation protection container 11, in which the shutter is closed, or in which the radiation source 10 is not located in the beam axis a of the radiation waveguide 113.

The invention claimed is:

1. A radiation protection container for a radiation source of a measuring system for radiometric density or fill level measurement, comprising:
    a first base body having a first planar surface,
    a second base body having a second planar surface,
    a first connecting structure which connects the first base body and the second base body to the surfaces in a form-fitting manner, in such a way that the surfaces define a planar plane,
    a straight-axis radiation waveguide extending in the plane, which is formed by the two base bodies, having a first open end region to which the radiation source can be fixed, and
    a second open end region,
    at least one first radiation absorption structure, which is formed by depressions and complementary elevations in the first surface and in the second surface, respectively, such that the first radiation absorption structure extends in the plane, proceeding from the radiation waveguide.

2. The radiation protection container according to claim 1, wherein the radiation absorption structure has a profile proceeding from the radiation waveguide in each case.

3. The radiation protection container according to claim 1, wherein the radiation absorption structure has a profile in the plane, in relation to the beam axis, which is curved in the shape of a circular segment by up to 90° towards the first end region.

4. The radiation protection container according to claim 1, comprising:
    three radiation absorption structures arranged in the plane, which are arranged in each case at an increasing distance from the first end region, in relation to the beam axis.

5. The radiation protection container according to claim 1, wherein the radiation absorption structure has a rectangular cross section.

6. The radiation protection container according to claim 1, wherein the first base body and/or the second base body is/are made of a steel.

7. The radiation protection container according to claim 1, wherein the first connecting structure is configured as a screw connection.

8. The radiation protection container according to claim 6, wherein the first connecting structure is configured as a welded connection.

9. A measuring system for radiometrically determining the density and/or fill level of a filling material located in a container, comprising:
    a radiation protection container, including:
        a first base body having a first planar surface,
        a second base body having a second planar surface,
        a first connecting structure which connects the first base body and the second base body to the surfaces in a form-fitting manner, in such a way that the surfaces define a planar plane,
        a straight-axis radiation waveguide extending in the plane, which is formed by the two base bodies, having
            a first open end region to which the radiation source can be fixed, and
            a second open end region,
        at least one first radiation absorption structure, which is formed by depressions and complementary elevations in the first surface and in the second surface, respectively, such that the first radiation absorption structure extends in the plane, proceeding from the radiation waveguide;

wherein the radiation protection container can be attached, in relation to the container, such that the second end region of the radiation waveguide is directed away from the container, a radioactive radiation source which is fixed to the first end region of the radiation waveguide, a detector unit which can be attached to the container, opposite the radiation source, in the beam axis, in order to detect a radiation intensity of the radiation source after passing through the filling material, an evaluation unit which is designed to determine the density and/or the fill level of the filling material in the container on the basis of the received radiation intensity.

10. The measuring system according to claim 9, wherein the radiation source can be fastened to the radiation protection container using a screw connection in such a way that a thread axis of the screw connection extends in parallel with the beam axis.

11. The measuring system according to claim 10, wherein the radiation source is arranged having a defined radial offset with respect to the thread axis of the screw connection, and wherein the radiation waveguide is arranged such that its beam axis has the defined radial offset to the thread axis of the screw connection.

\* \* \* \* \*